US012394308B2

(12) United States Patent
Chatni et al.

(10) Patent No.: US 12,394,308 B2
(45) Date of Patent: *Aug. 19, 2025

(54) METHOD, ELECTRONIC DEVICE, AND SYSTEM FOR DETECTING OVERSPEEDING

(71) Applicant: GRABTAXI HOLDINGS PTE. LTD., Singapore (SG)

(72) Inventors: Muhammad Rameez Chatni, Mukilteo, WA (US); Munirul Abedin, Sammamish, WA (US); Laiyi Lin, Singapore (SG); Miaojun Li, Seattle, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,128

(22) Filed: Feb. 28, 2024

(65) Prior Publication Data

US 2024/0203249 A1 Jun. 20, 2024

Related U.S. Application Data

(63) Continuation of application No. 18/031,509, filed as application No. PCT/SG2021/050561 on Sep. 15, 2021.

(30) Foreign Application Priority Data

Oct. 16, 2020 (SG) ........................... 10202010286X

(51) Int. Cl.

*G08G 1/052* (2006.01)
*G08G 1/00* (2006.01)

(Continued)

(52) U.S. Cl.

CPC ........... *G08G 1/052* (2013.01); *G08G 1/0112* (2013.01); *G08G 1/0129* (2013.01); *G08G 1/123* (2013.01); *G08G 1/207* (2013.01)

(58) Field of Classification Search

CPC .... G08G 1/052; G08G 1/0112; G08G 1/0129; G08G 1/123; G08G 1/207

See application file for complete search history.

(56) References Cited

U.S. PATENT DOCUMENTS 6,505,106 B1 * 1/2003 Lawrence ............. G01M 15/05 701/32.4
11,132,853 B1 * 9/2021 Akhtar ................... G08G 1/202

(Continued)

FOREIGN PATENT DOCUMENTS

CN 103632540 A 3/2014
CN 111243318 A * 6/2020 ............ G08G 1/123

(Continued)

OTHER PUBLICATIONS

Translation of CN-111243318-A, 7 pages (Year: 2020).*

(Continued)

*Primary Examiner* — Dale W Hilgendorf

(74) *Attorney, Agent, or Firm* — Buckley Maschoff & Talwakar LLC

(57) ABSTRACT

A method of detecting overspeeding for a vehicle, the method including obtaining historical trajectory data of a fleet of geographical areas from an electronic database; determining, by a microprocessor of a server, a distribution of speed of the historical trajectory data for each geographical area; based on the distribution of speed, determining, by a microprocessor of an electronic device associated with the vehicle, that a current speed of the vehicle is above a threshold speed corresponding to a pre-determined percen- (Continued)

tile of the distribution. A system and a computer-readable medium storing computer executable code for the method.

18 Claims, 7 Drawing Sheets

(51) Int. Cl.
*G08G 1/01* (2006.01)
*G08G 1/123* (2006.01)

(56) References Cited

U.S. PATENT DOCUMENTS

| | | | | |
|---|---|---|---|---|
| 11,756,351 | B1* | 9/2023 | Akhtar | G08G 1/202 346/33 R |
| 11,823,572 | B2* | 11/2023 | Chatni | G08G 1/052 |
| 11,995,983 | B2* | 5/2024 | Chatni | G08G 1/20 |
| 2012/0256770 | A1* | 10/2012 | Mitchell | G08G 1/127 340/989 |
| 2013/0164714 | A1* | 6/2013 | Hunt | G09B 19/14 434/65 |
| 2013/0211660 | A1* | 8/2013 | Mitchell | G06Q 10/0639 701/29.3 |
| 2013/0274956 | A1* | 10/2013 | Pilutti | G08G 1/096716 701/1 |
| 2014/0045147 | A1* | 2/2014 | Mohn | G06F 3/0484 434/69 |
| 2014/0195106 | A1* | 7/2014 | McQuade | G09B 9/052 701/33.9 |
| 2015/0081399 | A1* | 3/2015 | Mitchell | G08G 1/20 705/7.38 |
| 2015/0269790 | A1* | 9/2015 | Batcheller | B60K 35/22 701/537 |
| 2016/0086391 | A1* | 3/2016 | Ricci | G07C 5/08 701/29.3 |
| 2016/0210854 | A1* | 7/2016 | Van Laethem | G08G 1/0133 |
| 2019/0016341 | A1* | 1/2019 | Nelson | G08G 1/0133 |
| 2019/0286948 | A1* | 9/2019 | Sathyanarayana | G05D 1/0251 |
| 2019/0295412 | A1* | 9/2019 | Grubwinkler | G08G 1/0141 |
| 2020/0098258 | A1* | 3/2020 | Morris | G01C 21/3889 |
| 2020/0201357 | A1* | 6/2020 | Zeng | G06Q 10/04 |
| 2023/0419824 | A1* | 12/2023 | Han | B60W 30/12 |

FOREIGN PATENT DOCUMENTS

| | | | |
|---|---|---|---|
| WO | 2015170385 | A1 | 11/2015 |
| WO | 2018122804 | A1 | 7/2018 |

OTHER PUBLICATIONS

The International Search Report and Written Opinion dated Nov. 15, 2021 which was issued in connection to International Application No. PCT/SG2021/050561. Previously submitted in an IDS filed on Apr. 12, 2023.

Information Disclosure Statement dated Apr. 12, 2023 which filed in connection with U.S. Appl. No. 18/031,509.

Information Disclosure Statement dated Jun. 29, 2023 which filed in connection with U.S. Appl. No. 18/031,509.

The International Preliminary Report of Palatability (I PRP) dated May 23, 2022 which was issue by the Intellectual Property Office of Singapore (IPOS) in connection to International Application No. PCT/SG2021/050561.

892 Form dated Sep. 27, 2023 with was received in connection with U.S. Appl. No. 18/031,509.

892 Form dated Jan. 24, 2024 with was received in connection with U.S. Appl. No. 18/031,509.

* cited by examiner

METHOD, ELECTRONIC DEVICE, AND SYSTEM FOR DETECTING OVERSPEEDING

CROSS REFERENCE

The present application is a non-provisional continuation claiming priority to non-provisional application Ser. No. 18/031,509 (U.S. Pat. No. 11,995,983), which was filed on Apr. 12, 2023, and which claims priority under 35 U.S.C. 371, to PCT patent application PCT/SG2021/050561, which was filed on Sep. 15, 2021, which claims priority to Singapore patent application Ser. No. 10/202,010286X which was filed on Oct. 16, 2020, the contents of which are incorporated by reference herein in their entirety.

TECHNICAL FIELD

An aspect of the disclosure relates to a method of detecting overspeeding for a vehicle of a fleet. Another aspect of the disclosure relates to an electronic device for detecting overspeeding for a vehicle of a fleet. Another aspect of the disclosure relates to a system for detecting overspeeding for a vehicle of a fleet.

BACKGROUND

For some countries, the road systems do not adequately provide legal speed limits which can be used to determine whether drivers of a fleet are over speeding. There may be variations between countries, for example, some countries may have well defined legal speed limits, whereas other countries may lack speed limits, even for highways. Existing solutions work for countries or geographical areas where the map data is enriched with speed limits for highways, local roads and even alleys. However, existing techniques for enriching map data are resource intensive and required manual input. Thus, there is a need to provide for more efficient methods of detecting speeding.

SUMMARY

An aspect of the disclosure relates to a method of detecting overspeeding for a vehicle of a fleet. The method may include obtaining historical trajectory data of the fleet of each geographical area of a plurality of geographical areas from an electronic database. The method may include determining, by a microprocessor of a server, a distribution of speed of the historical trajectory data for each geographical area. The method may include, based on the distribution of speed, determining, by a microprocessor of an electronic device associated with the vehicle, that a current speed of the vehicle is above a threshold speed corresponding to a pre-determined percentile of the distribution of speed in a current geographical area in which the current speed may be recorded, which current geographical area corresponds to at least one of said each geographical area. The server and the electronic database may be communication coupled to each other via a communication interface. Obtaining may include communicating, by the server, an electronic request to the electronic database for the historical trajectory data, and may further include communicating the historical trajectory data from the electronic database to the server via the communication interface.

An aspect of the disclosure relates to a system including a fleet, a server, and a plurality of electronic devices, wherein each device of the plurality of electronic devices may be associated with a vehicle of a fleet, and may include:

- a trajectory data acquisition circuit configured to acquire current trajectory data;
- a processor configured to, based on a distribution of speed, determine, if a current speed of the vehicle may be above a threshold speed corresponding to a pre-determined percentile of the distribution of speed in a current geographical area in which the current speed may be recorded, which current geographical area corresponds to at least one of said each geographical area,
- wherein the server may be configured to obtain historical trajectory data of the fleet of each geographical area of a plurality of geographical areas from an electronic database; and determine, by a microprocessor, the distribution of speed of the historical trajectory data for each geographical area.

An aspect of the disclosure relates to a method of detecting overspeeding for a vehicle of a fleet. The method may include obtaining historical trajectory data of the fleet of each geographical area of a plurality of geographical areas from an electronic database. The method may include determining, by a microprocessor of a server, a distribution of speed of the historical trajectory data for each geographical area. The method may include training an electronic classifier into a trained classifier based on the distribution of speed, e.g., based on one or more percentiles of the distribution of speed. The server and the electronic database may be communication coupled to each other via a communication interface. Obtaining may include communicating, by the server, an electronic request to the electronic database for the historical trajectory data, and communicating the historical trajectory data from the electronic database to the server via the communication interface. The method may include, calculating, on an electronic device associated with the vehicle a determined probability of future overspeeding, and may further include determining that the determined probability of future overspeeding is higher than a pre-determined threshold.

An aspect of the disclosure relates to an electronic device. The electronic device may include a trajectory data acquisition circuit configured to acquire current trajectory data. The electronic device may include a communication circuit configured to receive pre-trained weights for a trained classifier, for example, from a server. The electronic device may include a processor configured to use the trained classifier configured with the pre-trained weights to calculate, based on the trajectory data, a probability of future overspeeding. The electronic device may further determine if the probability of future overspeeding is higher than a pre-determined threshold.

An aspect of the disclosure relates to a system including a server and a plurality of electronic devices. Each device of the plurality of electronic devices may be associated with a vehicle of a fleet and may be configured according to various embodiments. The server may be configured to obtain historical trajectory data of the fleet of each geographical area of a plurality of geographical areas from an electronic database. The server may be configured to generate pre-trained weights as a result of training the classifier, and may further be configured to upload the pre-trained weights to the electronic device thereby providing the trained classifier on the electronic device.

Aspects of the disclosure relate to a computer program product for each of the methods disclosed herein in accordance with various embodiments, the computer program product including computer executable code including instructions which, when the program may be executed by a computer, cause the computer to carry out the method.

An aspect of the disclosure relates to a non-transitory computer-readable medium storing computer executable code including instructions to obtain current trajectory data from a trajectory data acquisition circuit. The executable code may include instructions to receive pre-trained weights for a trained classifier, e.g., from a server, via a communication circuit configured. The executable code may include instructions to configure a classifier with the pre-trained weights into a trained classifier. The executable code may include instructions to calculate, using the trained classifier and based on the trajectory data, a probability of future overspeeding.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
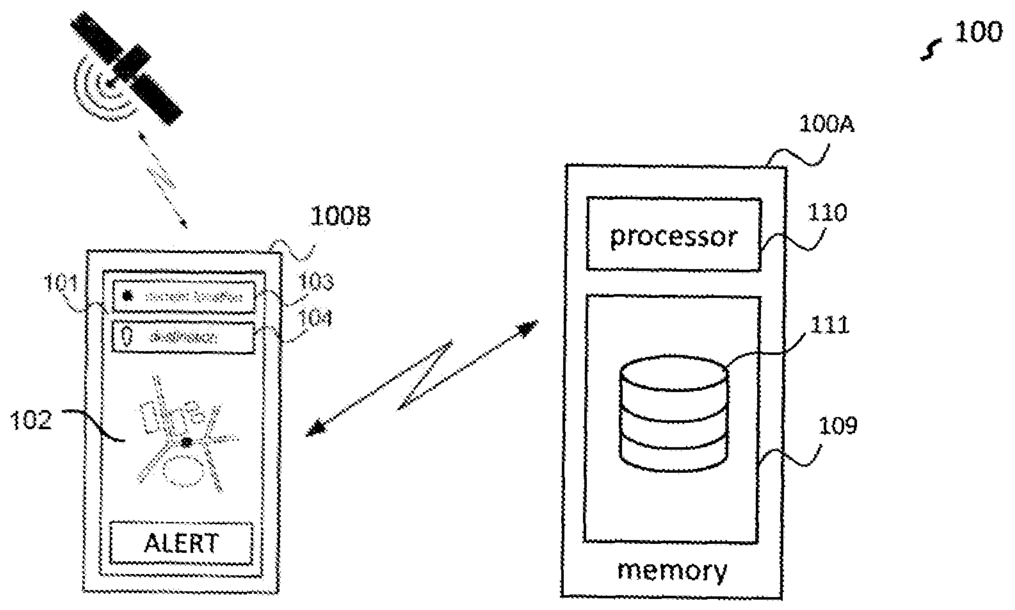
FIG. 1 shows a schematic view of system 100 including an electronic device 100B and a server 100A in accordance with various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the methods, devices, or systems are analogously valid for the other methods, devices, or systems. Similarly, embodiments described in the context of a method are analogously valid for a device or a system and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

According to various embodiments, the method of detecting overspeeding for a vehicle of a fleet may include obtaining historical trajectory data of the fleet of each geographical area of a plurality of geographical areas from an electronic database. As used herein and in accordance with various embodiments, the expression "trajectory data" or "historical trajectory data" may include geographical data, such as geospatial coordinate and may further include time, for example, as provided by the global positioning system GPS. Alternatively to time or in addition to time, trajectory data or historical trajectory data may include speed associated with a trajectory data point, the speed may be calculated based on one or more adjacent points, from an average, a fitting, etc. Trajectory data may be obtained from the recording of positions of one or more moving vehicles. For example, latitude, longitude and time, the trajectory data may further include elevation. The GPS coordinates may be according to the World Geodetic System, WGS 84, for example, version G1762, however it is not limited thereto. According to various embodiments, the trajectory data may include a plurality of trajectory data points, wherein each data point may include latitude, longitude, and speed, and may further include bearing. A trajectory trace, e.g., a GPS trace, may be defined to be a sequence of records associated with timestamps. Each record (also named as trajectory data point) includes location and timestamp. Historical trajectory data may include a collection of a plurality of trajectory traces from one or more vehicles of the fleet stored over time. The trajectory data may be real world data, for example real world GPS data.

According to various embodiments, the geographical area represents an area on earth's surface. For example, a city may be represented by the plurality of geographical areas, which may be defined by applying a grid onto a city's map. In one example, the grid divides a map into geographical areas (also named as grid cells) of pre-determined sizes, such as 250 meters×250 meters. As used herein and in accordance with various embodiments, the terms 'geographical' and 'geospatial' may be used interchangeably.

According to various embodiments, the method of detecting overspeeding for a vehicle of a fleet may further include determining, by a microprocessor of a server, a distribution of speed, of the historical trajectory data for each geographical area. According to various embodiments, a distribution of speed may be a cumulative distribution function, and may further be normalized.

According to some embodiments, the historical trajectory data may be pre-processed before determining the distribution of speed, alternatively, trajectory data may be pre-processed before being added to the historical data. Such pre-processing may reduce the amount of noise, e.g., as caused by GPS positioning errors.

According to various embodiments, current trajectory data may be pre-processed, for example do avoid inaccuracies in position and/or speed calculations. Thus, trajectory data which is added to the historical trajectory data may be pre-processed current trajectory data.

According to various embodiments, historical trajectory data may be obtained by storing trajectory data in a database. The trajectory data, e.g. GPS data, from the electronic device of vehicles and drivers of the fleet may be collected, stored in a database. As an electronic device (e.g. smartphone or tablet) is associated with a driver, data from drivers may be leveraged to infer speed limits in different cities and countries.

According to various embodiments, driver profile data of a driver associated with the electronic device may include driver feature data, for example, indicating past overspeeding incidents. The driver profile may further include respective vehicle characteristics data of the vehicle associated with the driver, for example, that the vehicle is a four wheel vehicle or a 2 wheel vehicle, motor power, etc.

According to some embodiments, the historical trajectory data may be de-skewed before determining the distribution of speed, alternatively, trajectory data may be de-skewed before being added to the historical data. Such de-skewing may be used, e.g., when GPS data is captured at a fixed rate (e.g. 1 trajectory data point/second), which would produce a much higher data amount per distance when the vehicle is traveling at a lower speed as compared to a higher speed.

According to some embodiments, the method of detecting overspeeding for a vehicle of a fleet may further include de-skewing the distribution of speed based on inverse proportional relation to the speed. Since a rate of trajectory data point acquisition is based on an inverse proportional relation to the speed. For example, the de-skewing may be linear and implemented on the distribution of speeds. De-skewing of the distribution may consume less computational resources than de-skewing trajectory data.

The method of detecting overspeeding for a vehicle of a fleet may include determining, based on the distribution of speed, that a current speed of the vehicle may be above a threshold speed. According to some embodiments, this determination is statistical based on a statistical model. According to some embodiments, this determination is based on a machine learning model, and may be carried out by machine learning, for example, a trained classifier.

According to some embodiments, the method of detecting overspeeding for a vehicle of a fleet may include determining, based on the distribution of speed, that a current speed of the vehicle may be above a threshold speed corresponding to a pre-determined percentile of the distribution of speed in a current geographical area in which the current speed is recorded. Alternatively or in addition, the method of detecting overspeeding for a vehicle of a fleet may include determining, based on the distribution of speed, a probability of future overspeeding.

According to various embodiments, the current geographical area may correspond to at least one of said each geographical area for which historical trajectory data is available in the server. The determining may be carried out by a microprocessor of the electronic device associated with the vehicle. The server and the electronic database may be communication coupled to each other via a communication interface.

According to various embodiments, an overspeeding or a risk (or a probability) of future overspeeding may be indicated to the driver by via of an alert, for example, using one or more of an audible alert, a voice alert, a message on a display, a push notification to the electronic device. Alternatively or in addition, an overspeeding or a probability of future overspeeding may be communicated from the electronic device to the server with metadata which may be aggregated over time (e.g, on a daily basis) and reported as a speeding report. The issuing alerts during driving may be turned off, for example, if distracting the driver is a concern.

A future overspeeding which is an anticipation of overspeeding can potentially thwart an incident since the driver is notified in advance and thus made aware that he is monitoring. According to various embodiments, prediction of future overspeeding (also named herein as imminent overspeeding) may be provided for the future, for example, the next minute, for example, from 20 to 30 seconds in advance.

In the method of detecting overspeeding for a vehicle of a fleet, obtaining historical trajectory data of the fleet may include communicating, by the server an electronic request to the electronic database for the historical trajectory data, and may further include communicating the historical trajectory data from the electronic database to the server via the communication interface.

According to some embodiments, the method of detecting overspeeding for a vehicle of a fleet may include calculating the threshold speed on the server based on the distribution of speed for each geographical area; and uploading the threshold speed of each geographical area of the plurality of geographical areas to the electronic device. Alternatively or in addition, the method may include uploading the respective percentiles or the respective threshold speed for all of the plurality of geographical areas to the electronic device. Uploading may be performed automatically via a respective communication interface between the server and the device, for example, on demand or regularly such once a week. Having a regular update, for example for a whole city or a whole country, reduces any time lag or the risk of not having the information available when needed due to a bad communication connection. Also a regular upload of the threshold, percentiles, or distribution, does not occupy much memory in the device or communication bandwidth as compared to uploading the complete historical data. Further, since the server does not expose the historical data to the device, an enhanced data protection is provided. According to various embodiments, the pre-determined threshold is a threshold speed or is determined based on the threshold speed.

According to some embodiments, the method may further include calculating, based on the distribution of speed, that a determined probability of future overspeeding may be higher than a pre-determined threshold. The calculation may be performed on the electronic device associated with the vehicle. If the determination runs on the device, it reduces the dependence on network connectivity and querying the backend.

According to various embodiments, the determined probability may be calculated by a trained classifier. The method may further include training an electronic classifier into the trained classifier based on the distribution of speed. The electronic device may store the trained classifier. The electronic device may include tensorflow, and the classifier may be based on tensor flow.

According to various embodiments, training may be further based on training contextual data including contextual information. Calculating the determined probability of future overspeeding may be further based on current contextual data including current contextual information. According to various embodiments, training contextual data may include training weather data, and, current contextual data may include current weather data. Alternatively or in addition, training contextual data may include training driver profiles and current contextual data may include a driver profile of an driver associated with the electronic device, wherein each of the training driver profiles and the driver profile may include driver feature data, for example, indicating past overspeeding incidents. Each of the training driver profiles and the driver profile may further include respective vehicle characteristics data of the vehicle associated with the driver, for example, that the vehicle is a four-wheel vehicle or a 2-wheel vehicle, motor power, etc. Alternatively or in addition, training contextual data and current contextual data may include one or more of respective: time of the day, day of the week, public holiday data.

According to various embodiments, contextual data and current contextual data may include one or more of respective: road condition data, road characteristics data, current traffic pattern, neighborhood type.

According to various embodiments, contextual data, such as training contextual data and current contextual data, may be selected from one or more of: weather data, driver profile data, time of the day, day of the week, public holiday data, day or night, road condition data, road segment condition, road segment type, road characteristics data, current traffic pattern, neighborhood type. Each driver profile may include vehicle characteristics data of a vehicle associated with a corresponding driver.

According to various embodiments, contextual data, such as training contextual data and current contextual data, may include a number of speeding incidents which have occurred in a given grid cell.

According to various embodiments, contextual data, and corresponding training contextual data and current contextual data, may include a speeding risk score of a given geographical area.

A speed pattern on a road segment that may lead to accident or crash is deemed as unsafe. It may be unsafe because of rain, storm, or other bad weather condition. A particular speed maybe safe during the day but not as safe at night. There may be specific traffic patterns that alters otherwise safe speed to unsafe. Road condition itself can pose some danger to traffic, e.g. potholes, turns, obstacles. Speed that is safe for cars may not be safe for a two-wheeler. Due to this reasoning, the definition of overspeeding as used in accordance with various embodiments is expanded beyond legal speed limits and is based on safety context. In the context of the present disclosure overspeeding may also mean unsafe speed.

A type of a road segment may be contextual information useful in determining safe or unsafe speeds. A map, for example, the map of a city, is divided with a grid into geographical areas, and a current position is snapped (mapped) to a grid cell that contains current position, i.e., the current geographical area. However, grid cells can have many different road types, some maybe highway, while others could be narrow local roads. Interestingly, it was found that traffic speed data analysis shows that vehicle speed distributions have the characteristics of a Gaussian Mixture Model. Each grid cell may have multiple road types within its boundary. For example, each grid cell may contain segments of highways, and local roads. The Gaussians may be determined before inputting into the classifier. For example, by an automated Gaussian deconvolution of the distribution. According to various embodiments, the system may include an automated Gaussian component determiner configured to determine the Gaussian components from the distribution of speed of the historical trajectory data for each geographical area. According to various embodiments, the classifier may be configured to, based on the Gaussian components, to determine the road type of one or more of the Gaussian components.

Additional characteristics of the vehicles movement patterns may be used in identifying the specific model/class the vehicle likely belongs to. This evaluation is fast, and requires small memory footprint. Once the road segment type is known, the related trained model for "unsafe high speed" prediction may be evaluated. In accordance with various embodiments, the system may include a pre-trained vehicle identifier, which may be a trained classifier, the identifier being configured to output a vehicle type based on vehicle movements patterns. The vehicle types may include one or more of: a four wheel vehicle, a 2 wheel vehicle, a motor power vehicle, a human power vehicle, a vehicle model.

It is noted that the specific road segment in the geographical area does not need to be determined, as the road segment type is sufficient. Therefore, the electronic device does not need to make use of a map indicating the road segment in which the driver is on, thus, utilizing less memory and computational resources for determining the context from the current position, than systems using comprehensive maps. This way to snap to context from position also works well given constraints of running on a mobile device.

According to various embodiments, the electronic classifier may be trained on the server. The pre-trained weights of the trained classifier may be uploaded from the server to the electronic device thereby providing the trained classifier on the electronic device. Upload of the pre-trained weights consumes little bandwidth and may be performed at regular intervals, e.g., once a week, or once a month.

An electronic device, in accordance with various embodiments, may include a trajectory data acquisition circuit configured to acquire current trajectory data. On device identification of proper context includes reading trajectory data (e.g. GPS sensor data) such as latitude, longitude, and speed. Speed may be determined from the time stamp, e.g, by a GPS module. The electronic device may include a communication circuit configured to receive pre-trained weights for a trained classifier from a server. The electronic device may include a processor. The processor may be configured to use a classifier configured with the pre-trained weights (i.e. the trained classifier) to calculate, based on the trajectory data, a probability of future overspeeding being higher than a pre-determined threshold. A trained classifier in this context may include the trained set of instructions and weights which may be processed (used) by the processor. The electronic device may include the classifier. The electronic device may include the trained classifier.

A system, in accordance with various embodiments may include a fleet, a server, and a plurality of electronic devices. Each electronic device is associated with a vehicle of the server. The system may include a trajectory data acquisition circuit configured to acquire current trajectory data. The system may include a communication circuit configured to receive the pre-trained weights for the trained classifier from a server. The system may include a processor configured to use a trained classifier configured with the pre-trained weights (i.e. the trained classifier) to calculate, based on the current trajectory data, a probability of future overspeeding being higher than a pre-determined threshold. A trained classifier in this context may mean the trained set of instructions and weights which may be processed (used) by the processor. The system may include the classifier. The system may include the trained classifier.

A non-transitory computer-readable medium, in accordance with various embodiments, may store computer executable code. The code may include instructions to make a computer (e.g., a processor of the electronic device) carry out the method of detecting overspeeding for a vehicle of a fleet in accordance with various embodiments. The code may include instructions to make a computer (e.g., a processor of the electronic device) to obtain current trajectory data from a trajectory data acquisition circuit. The code may include instructions to receive pre-trained weights for a trained classifier from a server via a communication circuit. The code may include instructions to configure a classifier with the pre-trained weights into a trained classifier. The code may include instructions to calculate, a probability of future overspeeding being higher than a pre-determined threshold. The calculation may use the trained classifier and may be based on a current speed and/or on the trajectory data. Trajectory data include at least two trajectory data points, optionally at least 3 trajectory data points. 3 trajectory data points or more may allow for averaging of speed thereby reducing or avoiding wrongly calculated speeds due to GPS acquisition errors.

FIG. 1 shows a system 100 including an electronic device 100B (e.g. a smartphone) and a server 100A. The server 100A and the electronic device 100B may be communication coupled to each other for transmission of data.

The server 100A has at least one processor 110 a memory 109 for storing the electronic database 111. The memory 109 and the processor 110 may be implemented in a single unit or may be placed in different locations, e.g., a cloud. It should be noted while the server 100A is described as a single server, its functionality will in practical applications, typically be provided by an arrangement of multiple server computers (e.g. implementing a cloud service). Accordingly, the functionality described herein provided by the server may be understood to be provided by an arrangement of servers or server computers. In one example the database may be implemented with DynamoDB, or another NoSQL database, since NoSQL databases don't impose on strict schema, which offers the flexibility of data structure thereby allowing for future data change as improvements are implemented. DynamoDB is reliable and can work on a massive scale and most of the operation may be performed on a cloud thus allowing for easy autoscaling.

The electronic device 100B may include a trajectory data acquisition circuit configured to acquire current trajectory data, for example, calculated from satellite signals (such as GPS). The electronic device 100B has a screen showing the graphical driver interface (GUI) of an e-hailing app that the electronic device's driver (e.g. a taxi driver) has previously installed on his electronic device and has opened (e.g., started) to carry out a transportation order. The electronic device 100B has a processor (not shown).

The GUI 101 includes a map 102 of the vicinity of the driver's position. The app may determine the position based on a location service, e.g. a GPS-based location service. The map 102 may also show the trajectory to be travelled, thus aiding the driver in driving. The GUI may include other features, for example, the GUI 101 may include a box for point of departure 103 and a box for destination 104 which may be received from the order. There may also be a menu (not shown) allowing the driver to select various options, e.g. information about passengers, whether payment is performed automatically or by cash, etc.

The GUI may include an alert box, which may appear or change appearance (e.g., flash) to indicate when the driver is overspeeding or when there is a risk of imminent overspeeding. In accordance with various embodiments, the electronic device 100B is configured to issue an alert when over speeding is detected and/or configured to issue an alert when imminent overspeeding is predicted. Imminent overspeeding may be defined as the probability of future overspeeding being higher than the pre-determined threshold.

Figure 2:
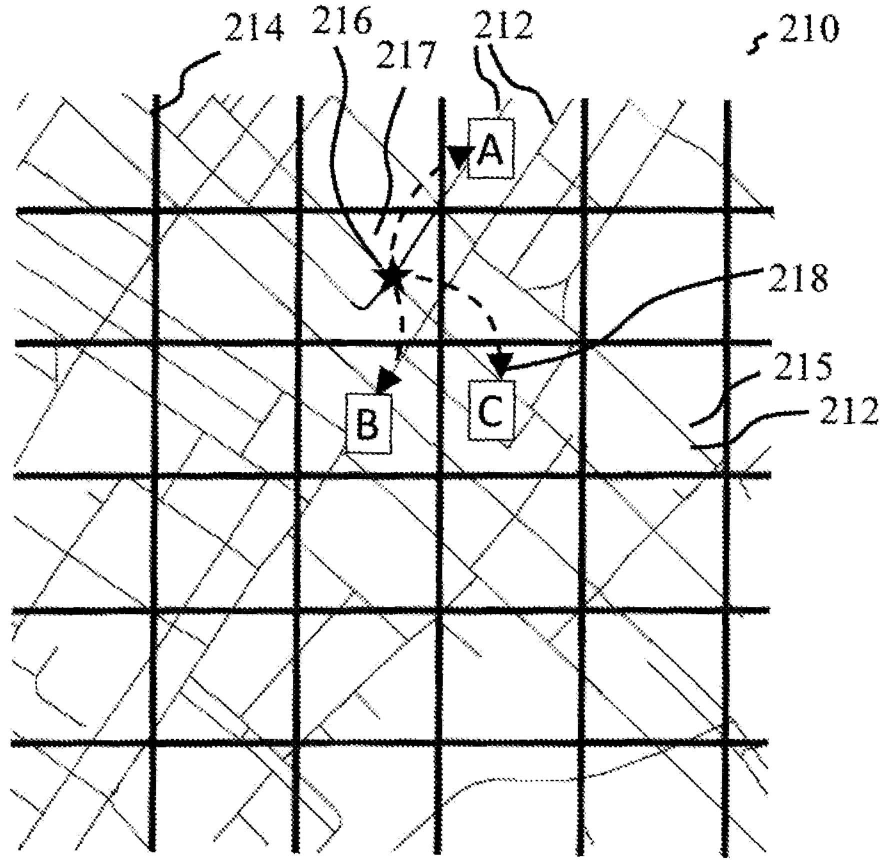
FIG. 2 shows a map area 210 of a city divided into a plurality of geographical areas.

FIG. 2 shows a map area 210 of a city divided into a plurality of geographical areas, shown, by way of example, as squares (such as 215 and 217) separated by lines 214. The map includes data representing roads 212. FIG. 2 shows a current position 216 of a vehicle (of a driver) which is in the geographical area 217. The method of detecting overspeeding for the vehicle may determine whether that a current speed of the vehicle is above the threshold speed. The method of detecting overspeeding for the vehicle may include determining if a probability of future overspeeding is higher than a pre-determined threshold. For example, the method may determine probabilities of overspeeding for different trajectories, for example from the current position to illustrated locations A, B, or C. The method may calculate the probabilities for overspeeding according to a chosen trajectory, for example the probabilities for locations may be A=10%, B=8%, C=82%. Given a pre-determined threshold, for example 75%, when the driver choses trajectory 218 and drives towards C, an alert may be triggered, e.g., shown on the electronic device, since 82%>75%.

Figure 3:
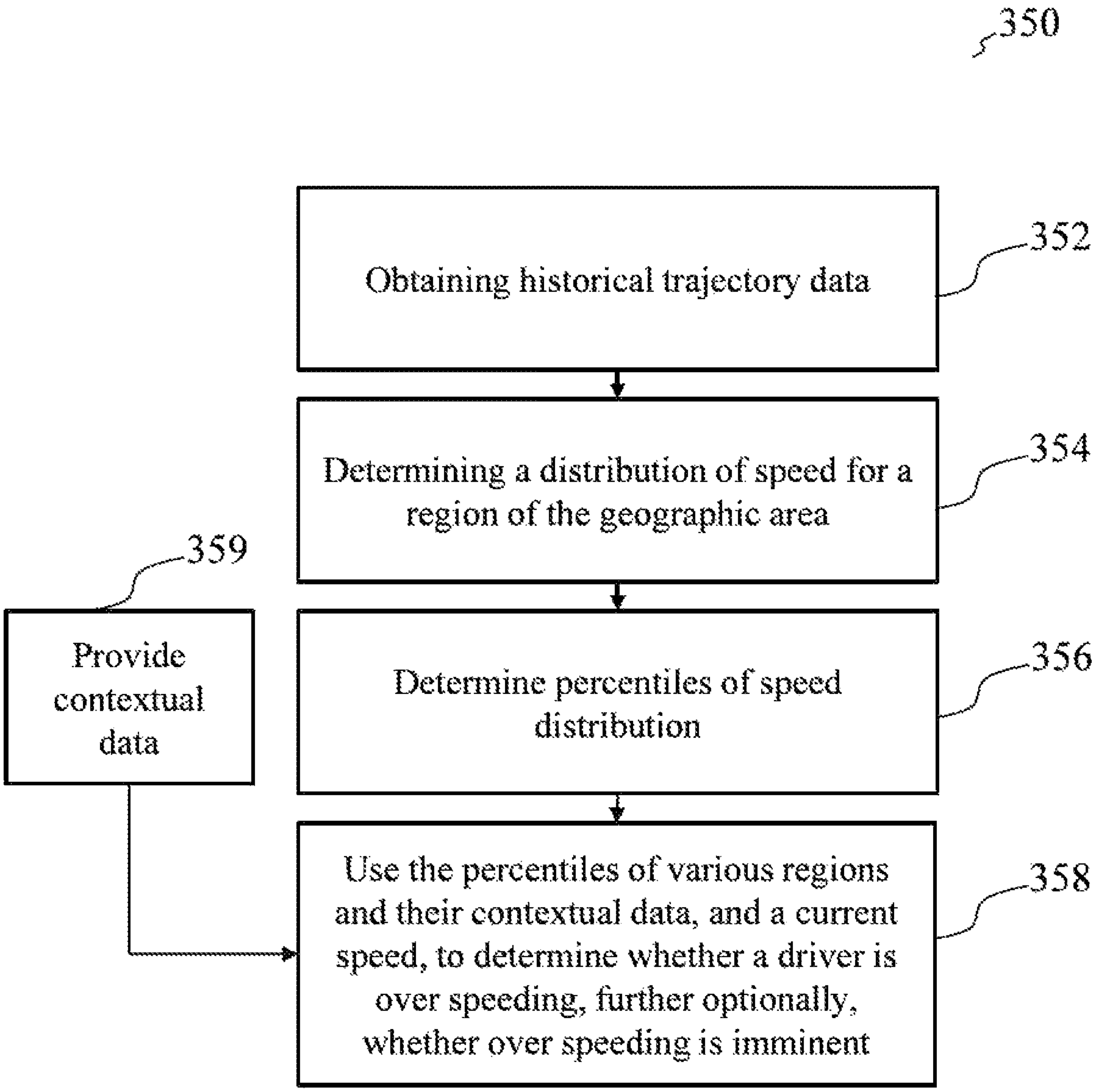
FIG. 3 shows a flowchart 350 of a method of detecting overspeeding 350 for a vehicle of a fleet, in accordance with some embodiments.

FIG. 3 shows a flowchart 350 of a method of detecting overspeeding 350 for a vehicle of a fleet, in accordance with some embodiments. The method 350 includes obtaining historical trajectory data 352 of the fleet of each geographical area of a plurality of geographical areas from an electronic database 111. Obtaining may include communicating, by the server 100A (e.g. by the processor of the server) an electronic request to the electronic database 111 for the historical trajectory data 352, and communicating the historical trajectory data from the electronic database 111 to the server 100A via the communication interface.

The method may include determining 354, by a microprocessor of a server 100A, a distribution of speed of the historical trajectory data for each geographical area.

Figure 4:
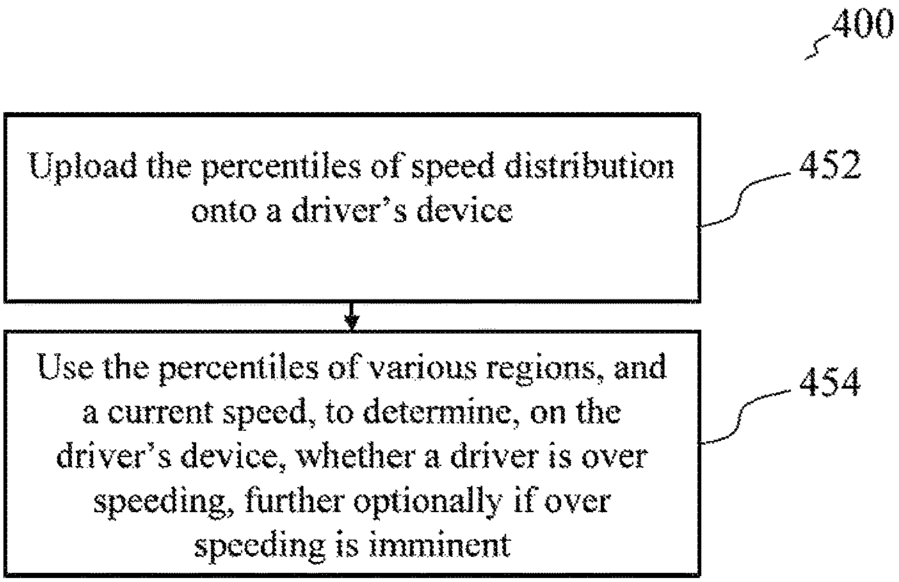
FIG. 4 shows a flowchart 400 of a method in accordance with various embodiments.

The method may include, based on the distribution of speed, determining, by a microprocessor of an electronic device 100B associated with the vehicle, that a current speed of the vehicle may be above a threshold speed corresponding to a pre-determined percentile of the distribution of speed 354 in a current geographical area in which the current speed may be recorded, which current geographical area corresponds to at least one of said each geographical area. For example, as illustrated in FIG. 3, one or more percentiles of speed distribution may be determined in 356. Optionally, the method may include de-skewing the distribution, e.g., before determining the percentiles, if necessary. In the example of FIG. 3, the method may include the provision of contextual data 359. In step 358, using, the percentiles of various regions and their contextual data, and a current speed, to determine whether a driver is over speeding or over speeding is imminent. Alternatively or in addition, the method may determine whether a driver is over speeding or over speeding is imminent based on the percentiles or on the distribution data of the distribution, as shown in FIG. 4. FIG. 4 shows a flowchart 400 of a method including uploading 452 the percentiles of speed distribution onto a driver's device, and a step 454 of using the percentiles of various regions, and a current speed, to determine, on the driver's device, whether a driver is over speeding or over speeding is imminent.

According to various embodiments, determining whether a driver is over speeding or over speeding is imminent may be based on Gaussian components of the distribution of speed which may be previously determined by the automated Gaussian component determiner. The use of the Gaussian components may allow a classifier to identify a road type.

Figure 5:
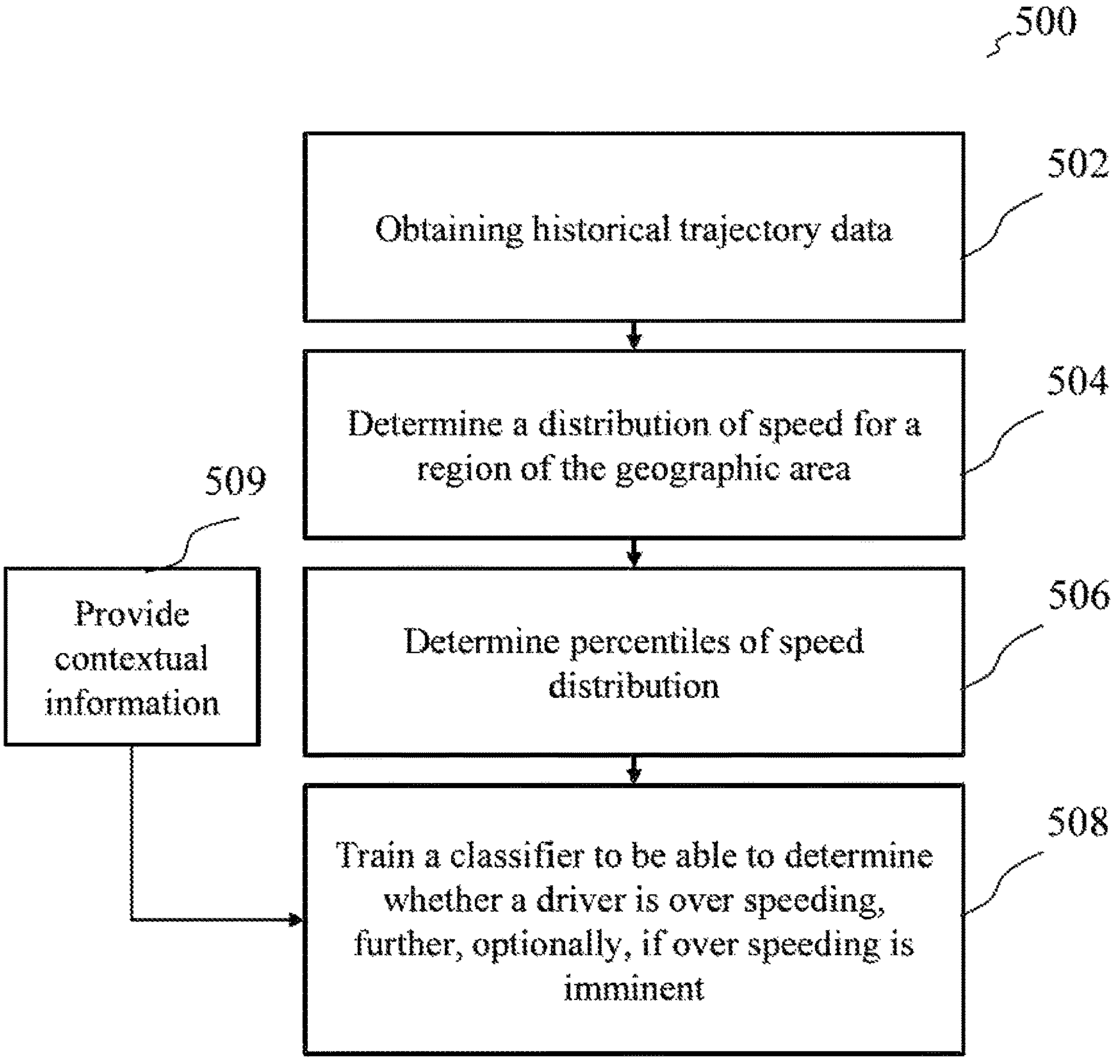
FIG. 5 shows a flowchart 500 of a method for training a classifier in accordance with various embodiments.

FIG. 5 shows a flowchart 500 of a method for training a classifier in accordance with various embodiments, illustrating a method of detecting overspeeding, in accordance with some embodiments. The method 500 includes obtaining historical trajectory data 502 of the fleet of each geographical area of a plurality of geographical areas from an electronic database 111. Obtaining may include communicating, by the server 100A (e.g. by the processor of the server) an electronic request to the electronic database 111 for the historical trajectory data 502, and communicating the historical trajectory data from the electronic database 111 to the server 100A via the communication interface.

The method for training may include determining 504, by a microprocessor of a server 100A, a distribution of speed of the historical trajectory data for each geographical area for a training dataset, classifying the distribution of speed, and comparing the result of the classification with a ground truth and iterating until a sufficient convergence has been achieved between the classification result of the classifier and the ground truth. Alternativeley or in addition, the dataset includes the percentiles of speed distribution, which may be determined in a step 506 and be part of the training dataset, so that training may be carried out considering the percentiles of speed distribution. Accuracy can be statistically determined with a test dataset including respective ground truth.

According to various embodiments, training may further be based on Gaussian components of the distribution of speed which may be previously determined by the automated Gaussian component determiner. The use of the Gaussian components may allow a classifier to identify a road type.

According to various embodiments, the training dataset may include contextual data at 509. Correspondingly, the test data set may include test contextual data. Contextual data may such as training (or test) contextual data and current contextual data, may be selected from one or more of: weather data, driver profiles, time of the day, day of the week, public holiday data, day or night, road condition data, road segment condition, road segment type, road characteristics data, current traffic pattern, neighborhood type. Each driver profile may include vehicle characteristics data of a vehicle associated with a corresponding driver. Processing includes training a classifier to be able to determine whether a driver is over speeding, further, optionally, if over speeding is imminent at 508.

Figure 6:
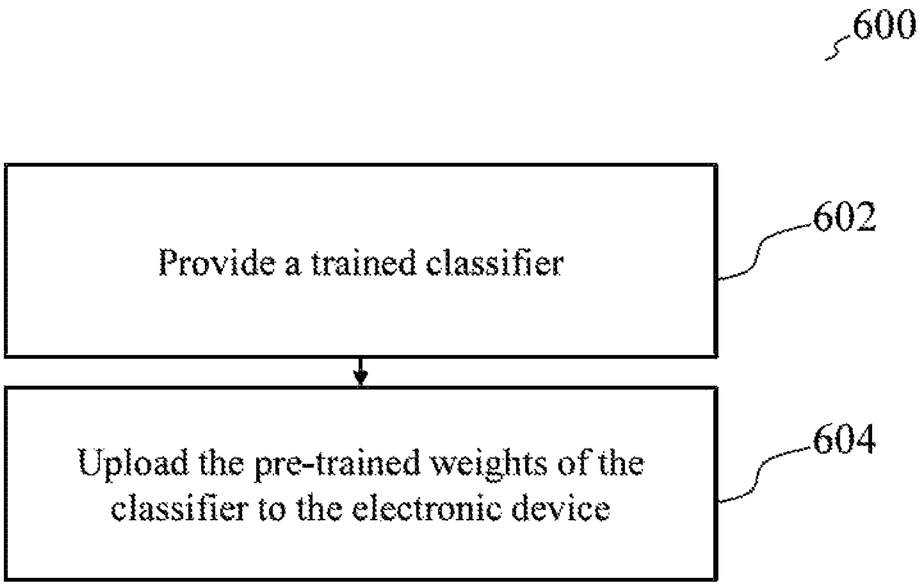
FIG. 6 shows a flowchart including training the classifier and uploading pre-trained weights in accordance with various embodiments.

According to various embodiments, the electronic classifier may be trained on the server 100A as illustrated in step 602 of the flowchart 600 of FIG. 6. Pre-trained weights of the trained classifier may be uploaded 604 from the server 100A to the electronic device 100B thereby providing the trained classifier on the electronic device 100B. Uploading only the pre-trained weights may enable regular updates on the electronic device 100B at a reduce bandwidth consumption as compared to uploading the whole instruction set of the trained classifier. Providing the training on a server 100A substantially decreases resource utilization on the electronic device 100B and allows for increased data security as the historical data does not need to be sent to the electronic device 100B.

Figure 7:
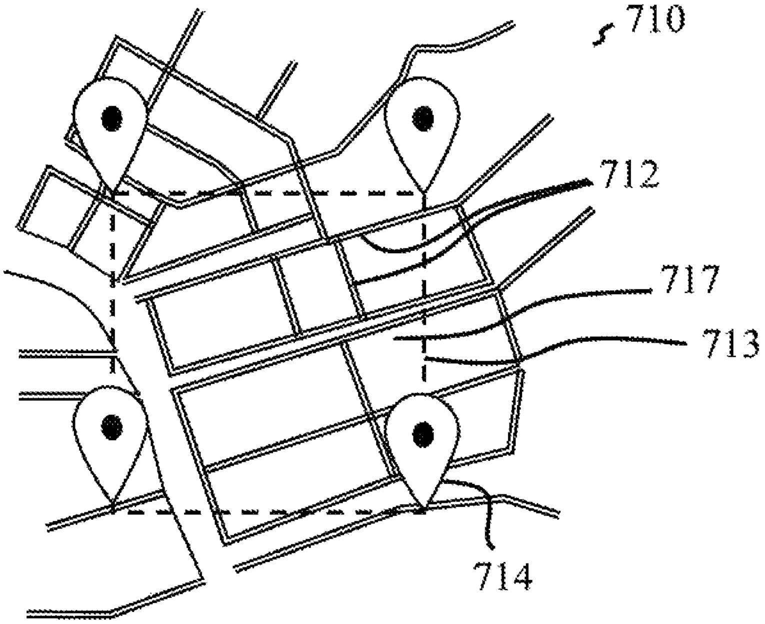
FIG. 7 shows a geographical area 717 of a map 710, the geographical area 717 being defined by four corners (pinpoints 714)

In the following, it will be demonstrated how the distribution of speed may be determined for an exemplary set of data. FIG. 7 shows a geographical area 717 of a map 710, the geographical area 717 being defined by four corners (pinpoints 714) of a 250 meters×250 meters grid cell 713, for illustrative purposes. The geographical area includes road segments 712.

Figure 8:
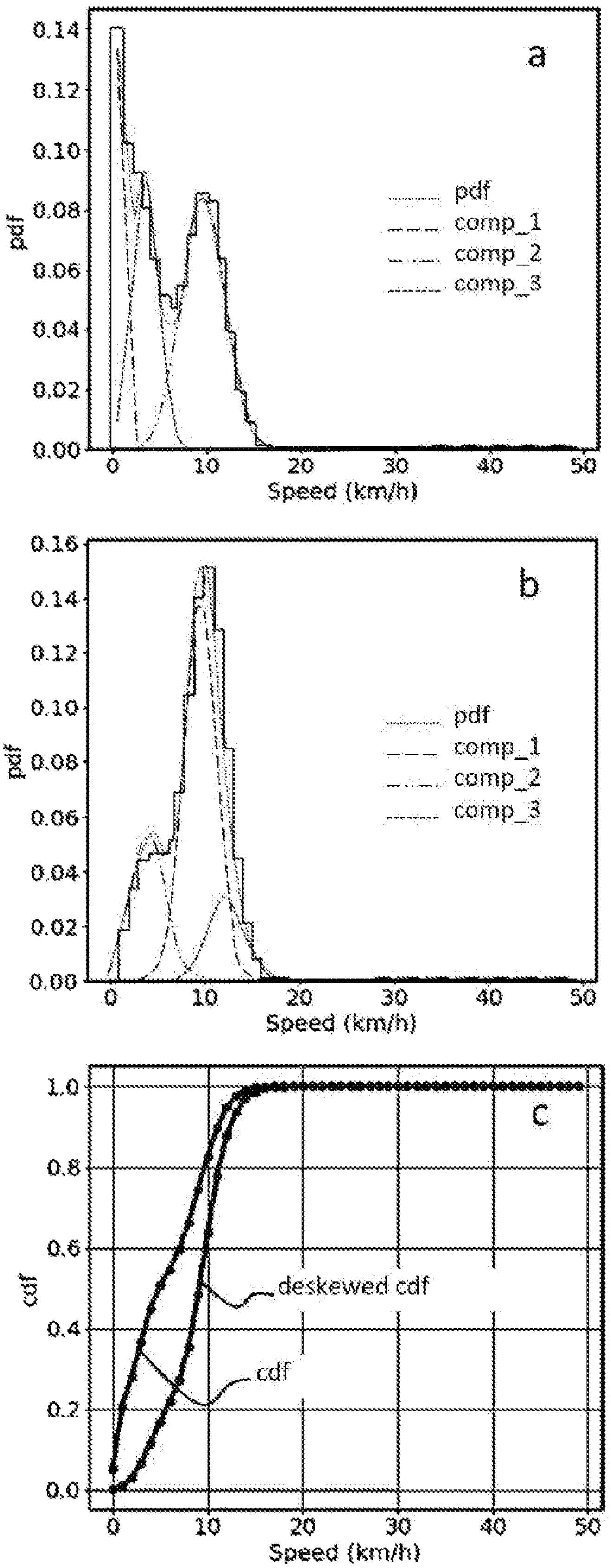
FIG. 8 shows speed distributions calculated from historical data of one geographical area, in accordance with various embodiments.

In the example of FIG. 7 and FIG. 8, data from the city of Batam, Indonesia is used for illustration. The trajectory data was filtered as follows, i) the speed is greater than 0; ii) the driver is marked as in transit 'IN TRANSIT', meaning that a trip is accepted by a driver, and the driver is currently moving a passenger to the destination; iii) the booking code is not NULL, meaning that the drivers activity is recognized (and not rejected) as a valid paid trip, and a verified code exists that could be looked up; iv) the accuracy of the trajectory data acquisition (e.g., GPS) is smaller or equal to 20 m; v) the ping status is confirmed (e.g. '2'), which confirms that uploaded data is valid and usable for further computation. For each grid cell within the city, trajectory data points meeting the above criteria are aggregated for a predetermine time frame, e.g., an entire month. From the four plots (of histogram (a) and histogram (b)) on FIG. 8, the top left shows the normalized distribution of speeds reported in the geographical area 717 for an entire month. The use of in transit marker and/or booking code avoids running the method when drivers movements are not part of trip related activities. Thus, computational resources may be saved.

FIG. 8 shows a histogram (a) of the distribution of speeds for the geographical area 717, be way of example. The histogram (a) on the top left is going to be skewed because vehicles driving at slower speeds will register more trajectory data points (e.g., GPS pings) compared to faster moving vehicles. The histogram (b) is a de-skewed histogram of the distribution of speeds which is created by a linear reweighting of the distribution shown in histogram (a). The trajectory data points associated with higher speed are given more weight than GPS location points at slower speeds. Stationary pings are excluded from the analysis because they do not provide any value for virtual speed limit determination. In each of histograms (a) and (b), the probability density function (pdf) is fitted over the distribution, and the Gaussian deconvolution is shown with 3 components comp_1, comp_2, and comp_3. The Gaussian deconvolution may be carried out by the automated Gaussian component determiner.

The graph (c) on the bottom left shows the cumulative distribution function before (cdf) and after deskewing (deskewed cdf) for speed. From the deskewed edf, the percenticles of the speed distribution may be determined, for example, the $85^{th}$, $95^{th}$, $99^{th}$ percentiles of speed distribution may be determined.

According to various embodiments, a file (e.g. a JavaScript® Object Notation (json) file) with the grid coordinates for the entire city, and their respective percentiles may be pushed down (e.g., uploaded) on the electronic device. During a trip, the grid position of the incoming GPS pings may be determined, and current speed may be compared to a threshold(s). The threshold(s) may be determined based on the percentiles, e.g., the $85^{th}$, $95^{th}$, $99^{th}$ percentile data. For example, an initial approach similar to $85^{th}$ percentile+8 km/h rule can be set as a threshold. Since the electronic device can work with the grid coordinates, it is not necessary to upload the whole map to the electronic device.

According to various embodiments, determining overspeeding may be carried out by comparing a current speed of the vehicle with a threshold speed. The threshold speed may correspond to the pre-determined percentile of the distribution of speed in a current geographical area, for example, $85^{th}$ percentile, $85^{th}$ percentile+8 km/h, $95^{th}$ percentile or $99^{th}$ percentile.

According to various embodiments, to determine if a driver is overspeeding, the method may consider sustainable overspeeding, over two or more speed determinations. Thus, in some embodiments, at least two pings (i.e. trajectory data points) including speed need to cross the set threshold and these at least two pings cannot be identical. In some embodiments, a single GPS ping breaking the threshold rule, will not be deemed as overspeeding. This allows for less error from instantaneous speed detection from GPS speed, since there is some time lag and at the best case the data rate is 1 Hz for phone GPS sensors. This also compensates for possible low accuracy caused by poor reception or multipath which can sometimes impact Doppler based speed measurement. In accordance with some embodiments, the accuracy of the trajectory data points must be better than 30 meters if they are to be considered for over-speeding detection.

Violations may be shown to the driver during the trip or at the end of trip via push notifications or audible alerts. Alternatively or in addition, the violations can be sent back to the backend with metadata which could be aggregated on a daily basis and reported as a speeding report. The issuing alerts during driving may turned off, for example, if distracting the driver is a concern.

Figure 9:
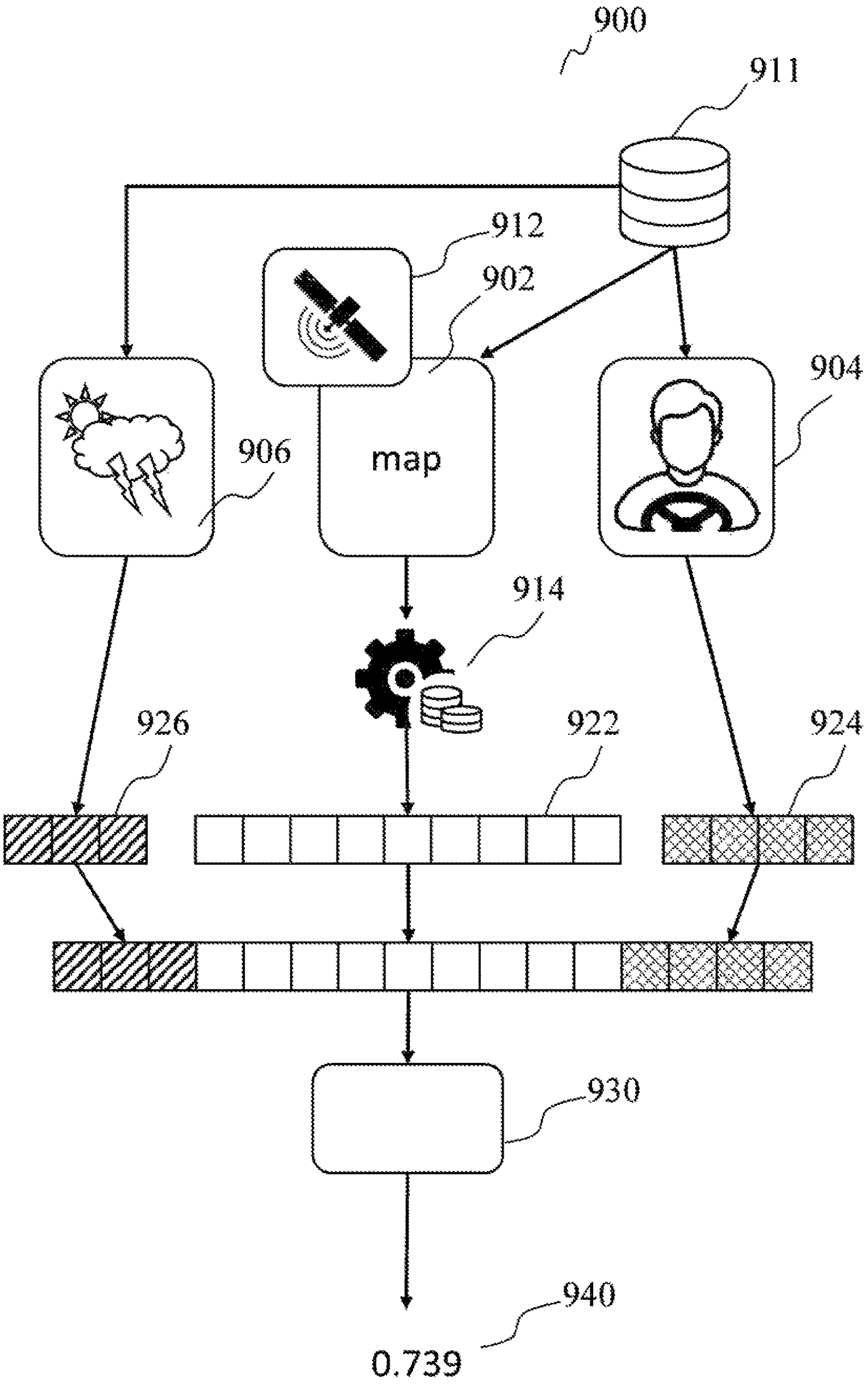
FIG. 9 shows a schematic diagram of a method which may be carried out by the electronic device, in accordance with various embodiments.

FIG. 9 shows a schematic diagram of a method 900 which may be carried out by the electronic device, in accordance with various embodiments. The electronic device may be provided including the trained classifier. The electronic device may include stored data 911 obtained from the server, such as map data 902, contextual data related to the driver (e.g. driver profile data) and/or vehicle 904, and other contextual data 906 (weather, time of the day). The map data 902 may include the coordinates for the geographical areas (e.g., grid coordinates), and may further include one or more of: speed distribution, percentiles, pre-determined speed thresholds. The electronic device may further make use of current trajectory data which may be obtained by a location receiver module 912, e.g., a GPS receiver. The stored data may be pre-processed by an feature generator 914, which may include the automated Gaussian component determiner and/or other data pre-processing. For example, given the distribution of speed and the current geographical area (or the current location from which the current geographical area may be determined), the feature generator 914 may determine the Gaussian components of the distribution of seed and may further identify the most likely road segment corresponding to the current location. The feature generator 914 may output an array of features, such as speed percentiles (for example 50th, 95th, 99th percentiles), and probability of accidents due to speeding. An example array could look like [20, 25, 27, 0.00002]. Said stored data may have been previously stored in a memory storage of the electronic device, e.g., after being received from the server, and may be used as input features for the trained classifier. Map features 922 may be obtained from map data 902, driver features 924 may be obtained from driver profile data 904, and contextual features 926 may be obtained from other contextual data 906. The trained classifier may be configured to embed the input features into neurons of its neural network, for example, the map featured 922, the driver features 924 and the contextual features 926 may be concatenated and used as input in concatenated form in a concatenated vector 930.

According to various embodiments, the trained classifier may be configured to calculate, based on the trajectory data, a probability of future overspeeding at 940. The electronic device may be configured to determine whether the probability of overspeeding is higher than a pre-determined threshold. For example, if the calculated probability is 0.739 and the threshold is 0.75, then future of overspeeding is not determined and, e.g., the electronic device may not issue an alert of future overspeeding. In another example, if the calculated probability is 0.85 and the threshold is 0.75, then future of overspeeding is determined and, e.g., the electronic device may issue an alert of future overspeeding. Alternatively or in addition, the classifier may be trained to determine that a current speed is unsafe, for example by having an output class representing the probability of current unsafe speed. The electronic device may compare the probability of current unsafe speed with a threshold and thereby determine whether the vehicle's current speed is safe or unsafe.

According to various embodiments, the calculation of the probability of future overspeeding and the determination whether the probability of overspeeding is higher than a pre-determined threshold may be carried out in real-time, therefore, while the driver is driving, he may receive alerts in real time to warn him about future overspeeding. Alternatively or in addition, the determination whether a current speed is unsafe may be carried out in real-time, therefore, while the driver is driving, he may receive alerts in real time to warn him about current unsafe speeding. According to various embodiments, trajectory data in which the driver is alerted may be kept out of training data when training an electronic classifier, for example trajectory data in which the driver is alerted may be kept out of the historical trajectory data, or filtered from the historical trajectory data before training.

Figure 10:
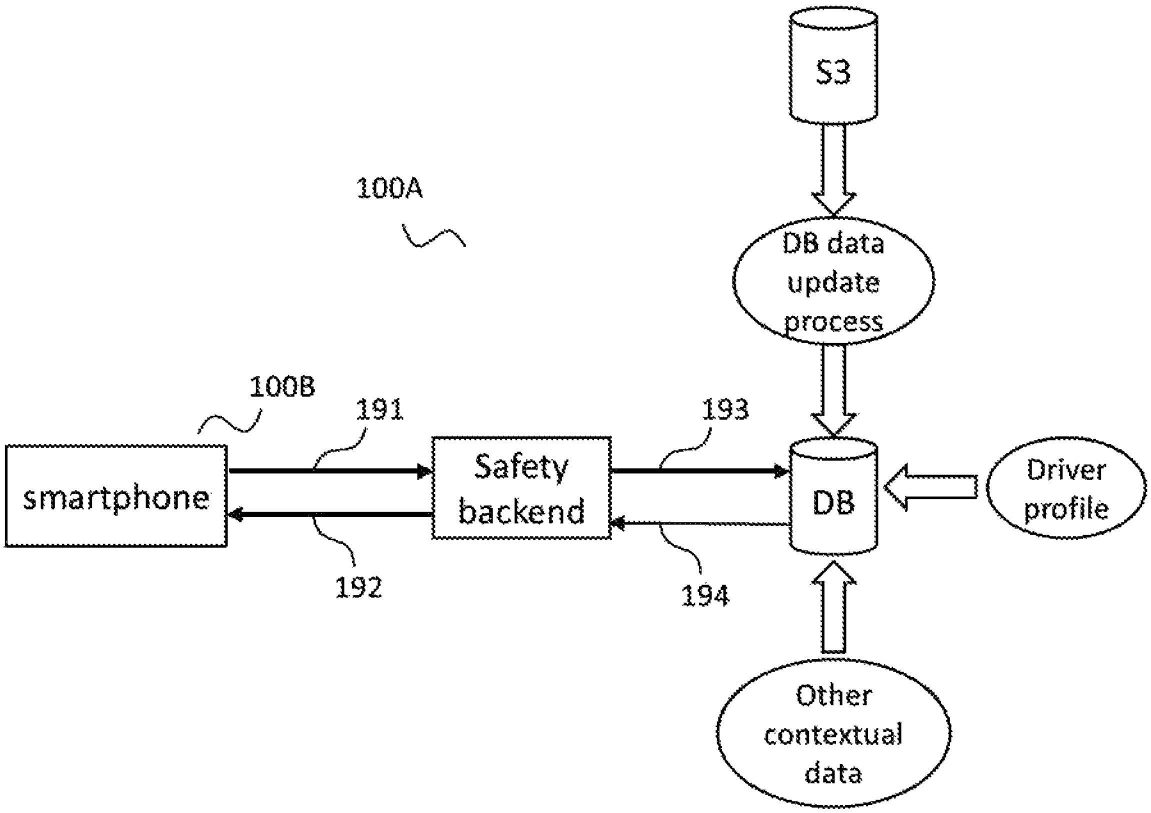
FIG. 10 shows a schematic of a system in accordance with an example.

FIG. 10 shows a schematic of a system in accordance with an example, including a server 100A and an electronic device 100B, e.g., a smartphone, which is associated with a driver. The electronic device 100B may send 191 data, such as trajectory data and current speed to the safety back end. The electronic device 100B may also query 191 the safety backend for features (which may be returned at 192). The safety back end may query 193 a database DB for features, and the database DB may send 194 the features to the safety backend which in turn may send the features to the electronic device 100B. Database DB may aggregate features obtained from the historical trajectory database S3, driver profile data, and other contextual data. Historical trajectory data may be updated at the DB by a periodic DB update data process. Therefore, the mobile portion of the process does not expose any APIs. The backend API provides ways to retrieve city, driver related feature set. This features change slowly, hence a rather low refresh rate is required, for example, every 2 or 3 weeks.

In one example, an API to obtain the map data, speed distribution, and other contextual data includes an exposed endpoint, an internal endpoint, and a method GET. This API may be called from the electronic device and will return map data, speed distribution (e.g. speed distribution data and/or percentiles of the speed distribution), and may return other contextual data, which may then be used for doing speed detection on the electronic device. In one example, the method GET may include latitude and longitude fields, for example as shown in Table 1.

TABLE 1

| Field name | Type | Definition | Example | Required |
|---|---|---|---|---|
| latitude | float | Latitude | 1.2312 | Yes |
| longitude | float | Longitude | 2.3212 | Yes |

In one example, a response from the API may include the features (e.g., map data, speed distribution, and other contextual) and may further include a pass indicator, for example, as shown in Table 2.

TABLE 2

| Field name | Type | Definition | Example | Required |
|---|---|---|---|---|
| pass | bool | Call is successful? | true \| false | Yes |
| features | json | Speed profile data, latitudes and longitudes determining the geographical area, and other contextual data | [. . .] | Yes |

In one example, an API to obtain the driver profile data includes an exposed endpoint, an internal endpoint, and a method GET. This API may be called from the electronic device and will return driver features such as age, history, etc., which may then be used for doing speed detection on the electronic device. In one example, the method GET does not include any parameter. In one example, the response from the API may include the driver profile (also named as driver features) and may further include a pass indicator, as shown in Table 3 below.

TABLE 3

| Field name | Type | Definition | Example | Required |
|---|---|---|---|---|
| pass | bool | Call is successful? | true \| false | Yes |
| features | json | Age, history, etc. | | Yes |

In one example, an API to obtain the other contextual data which requires frequent update (for example, could be real-time data), includes an exposed endpoint, an internal endpoint, and a method GET. This API may be called from the electronic device and will return contextual data which requires to be up-to-date such as weather data, real-time traffic data, etc., which may then be used for doing speed detection on the electronic device. In one example, the method GET may include latitude and longitude fields, and may further include a timestamp, for example as shown in Table 4.

TABLE 4

| Field name | Type | Definition | Example | Required |
|---|---|---|---|---|
| latitude | float | Latitude | 1.2312 | Yes |
| longitude | float | Longitude | 2.3212 | Yes |
| timestamp | int | Time | 15728873783 | No |

In one example, a response from the API may include the other contextual data and may further include a pass indicator, for example, as shown in Table 5.

TABLE 5

| Field name | Type | Definition | Example | Required |
|---|---|---|---|---|
| pass | bool | Call is successful? | true \| false | Yes |
| features | json | Weather, traffic, etc | | Yes |

The features obtained from the server, e.g., map data, speed distribution, and other contextual, driver profile data, contextual data which requires frequent update, may be deserialized then inserted into the trained classifier, e.g., tensorflow based infrastructure, of the electronic device.

In one example, a schema of the map data may be as shown in Table 6.

TABLE 5

| Attribute | Type | Description |
|---|---|---|
| cityID | String | Primary Key |
| countryCode | String | Country code of the city |
| maxLat | Float | Max latitude of the city |
| maxLon | Float | Max longitude of the city |
| minLat | Float | Min latitude of the city |
| minLon | Float | Min longitude of the city |
| speedProfile | JSON object | A JSON object contains a list of the distributions of speed for each geographical area |

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A mobile device associated with a vehicle, the mobile device comprising:
- a processor;
- a trajectory data acquisition module, configured to acquire current trajectory data of the vehicle;
- a memory, coupled to the processor, wherein the memory comprises instructions which, when executed by the processor, cause the processor to:
  - receive, from a remote server, data for a geographical area in which the vehicle is located, the data including, for each grid coordinate in the geographical area, a distribution of speed information associated with each grid coordinate, the distribution of speed information including at least one threshold value associated with the grid coordinate, wherein the at least one threshold value is calculated based on a selected percentile of the distribution of speed information associated with each grid coordinate;
  - identify, based on the current trajectory data, a current grid coordinate in the geographical area in which the vehicle is currently traveling;
  - determine, based on the current grid coordinate and a current speed of the vehicle, that the vehicle is one of (i) exceeding the at least one threshold value, and (ii) at risk of exceeding the at least one threshold value within a predetermined period of time; and
  - update a display of the mobile device to change an appearance of the display to display an alert.

2. The mobile device of claim 1, wherein the distribution of speed information associated with the geographical area is generated by:
- determining a historical distribution of speed of a set of historical trajectory data for the geographical area, the set of historical trajectory data received from a plurality of devices that have traveled in the geographical area; and de-skewing the historical distribution of speed based on an inverse proportional relation to a speed associated with each of a plurality of datapoints of the historical distribution of speed to produce the distribution of speed information.

3. The mobile device of claim 1, further comprising:

determining, based on the current trajectory data of the vehicle, a probability of the vehicle exceeding the at least one threshold value within a predetermined period of time; and determining that the vehicle is at risk of exceeding the at least one threshold value if the determined probability exceeds a probability threshold.

4. The mobile device of claim 3, wherein the determined probability is calculated by a trained classifier, the trained classifier trained based on the distribution of speed information.

5. The mobile device of claim 4, wherein the classifier is trained on a remote training server and wherein pre-trained weights of the trained classifier are uploaded from the remote training server to the mobile device thereby providing the trained classifier on the mobile device.

6. The mobile device of claim 4, wherein the trained classifier is further trained based on contextual data comprising contextual information, wherein determining that the vehicle is at risk of exceeding the at least one threshold value is further based on current contextual data associated with the vehicle.

7. The mobile device of claim 6, wherein the contextual data comprises training weather data, and the current contextual data comprises current weather data.

8. The mobile device of claim 6, wherein the contextual data comprises training driver profile data and the current contextual data comprises driver profile data of a driver associated with the vehicle, wherein each of the training driver profile data and the driver profile data comprises respective vehicle characteristics data and/or driver features.

9. The mobile device of claim 6, wherein the contextual data and the current contextual data comprise one or more of: time of a day, a day of a week, and a public holiday data.

10. The mobile device of claim 6, wherein the contextual data and the current contextual data comprise one or more of: a road condition data, a road characteristics data, a current traffic pattern, and a neighborhood type.

11. A method for operating a mobile device associated with a vehicle, the method comprising:

determining, based on a trajectory data acquisition module, current trajectory data of the vehicle;

receiving, from a remote server, data for a geographical area in which the vehicle is located, the data including, for each grid coordinate in the geographical area, a distribution of speed information associated with each grid coordinate, the distribution of speed information including at least one threshold value associated with the grid coordinate, wherein the at least one threshold value is calculated based on a selected percentile of the distribution of speed information associated with each grid coordinate;

identifying, based on the current trajectory data, a current grid coordinate in the geographical area in which the vehicle is currently traveling;

determining, based on the current grid coordinate and a current speed of the vehicle, that the vehicle is one of (i) exceeding the at least one threshold value, and (ii) at risk of exceeding the at least one threshold value within a predetermined period of time; and alerting a user of the mobile device of an unsafe speeding condition.

12. The method of claim 11, wherein alerting the user includes one of: (i) updating a display of the mobile device to display an alert, and (ii) causing the mobile device to issue an audible alert.

13. The method of claim 11, wherein the distribution of speed information associated with the geographical area is generated by:

determining a historical distribution of speed of a set of historical trajectory data for the geographical area, the set of historical trajectory data received from a plurality of devices that have traveled in the geographical area; and de-skewing the historical distribution of speed based on an inverse proportional relation to a speed associated with each of a plurality of datapoints of the historical distribution of speed to produce the distribution of speed information.

14. The method of claim 11, further comprising:

determining, based on the current trajectory data of the vehicle, a probability of the vehicle exceeding the at least one threshold value within a predetermined period of time; and determining that the vehicle is at risk of exceeding the at least one threshold value if the determined probability exceeds a probability threshold.

15. The method of claim 14, wherein the determined probability is calculated by a trained classifier, the trained classifier trained based on the distribution of speed information.

16. The method of claim 15, wherein the classifier is trained on a remote training server and wherein pre-trained weights of the trained classifier are uploaded from the remote training server to the mobile device thereby providing the trained classifier on the mobile device.

17. The method of claim 15, wherein the trained classifier is further trained based on contextual data comprising contextual information, wherein determining that the vehicle is at risk of exceeding the at least one threshold value is further based on current contextual data associated with the vehicle.

18. The method of claim 17, wherein the contextual data comprises training weather data, and the current contextual data comprises current weather data.

* * * * *